No. 770,317.

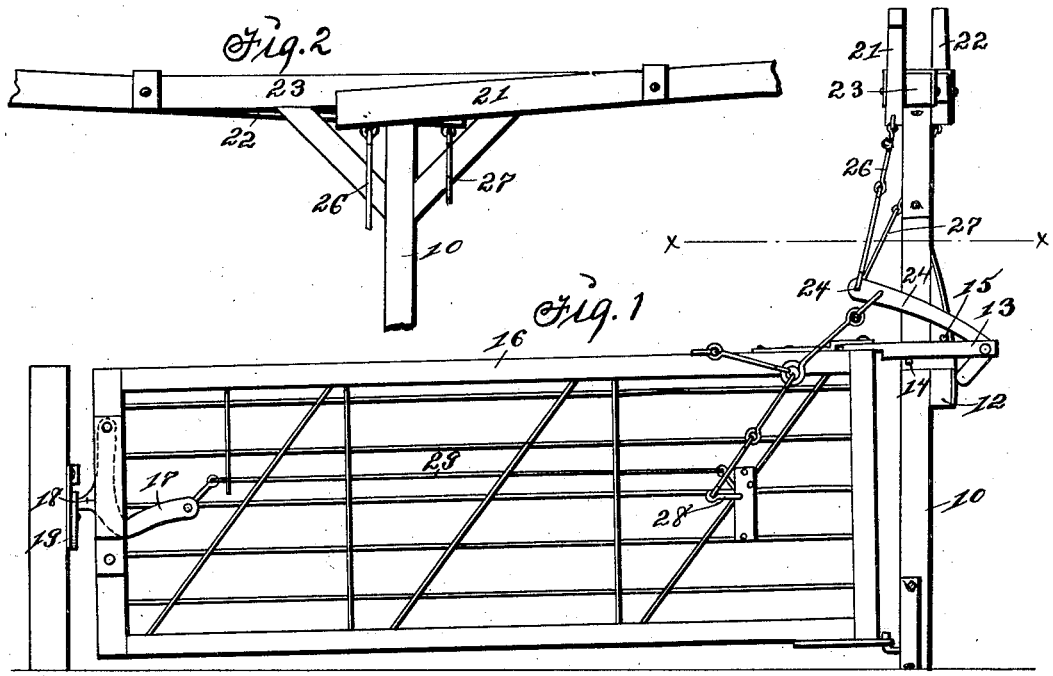
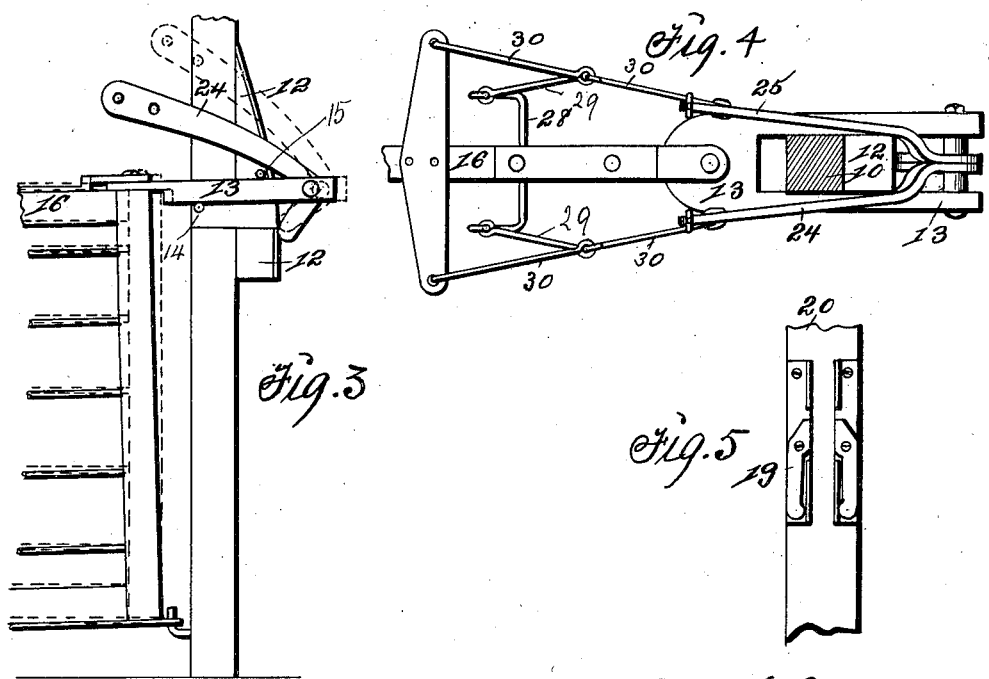

Patented September 20, 1904.

UNITED STATES PATENT OFFICE.

LEWIS P. ROLLINS, OF PRESCOTT, IOWA.

FARM-GATE.

SPECIFICATION forming part of Letters Patent No. 770,317, dated September 20, 1904.

Application filed June 9, 1904. Serial No. 211,851. (No model.)

*To all whom it may concern:*

Be it known that I, LEWIS P. ROLLINS, a citizen of the United States, residing at Prescott, in the county of Adams and State of Iowa, have invented a new and useful Farm-Gate, of which the following is a specification.

My object is to facilitate opening and closing a horizontally-swinging hinged gate by means of mechanism that will lift the front end of the gate and at the same time actuate a latch to free the front end of the gate as required to swing it to the right or left as the motions of the operating-levers are completed.

My invention consists in the construction, arrangement, and combination of elements and subcombinations, as hereinafter set forth, pointed out in my claims, and illustrated in the accompanying drawings, in which—

Figure 1 is a side view of the gate in a closed and latched position and shows the front end of the gate lower than the rear and hinged end. Fig. 2 shows the top portion of the gate-post having a fixed cross-head and levers pivoted to the ends of the cross-bar. Fig. 3 is an enlarged section of the hinged end of the gate that shows the upper corner connected with a post by means of a slidable frame. Fig. 4 is a view looking down from the line $x$ $x$ of Fig. 1 and shows the form of the slidable frame and its connection with the post and the gate. Fig. 5 is a face view of a section of a post and shows two gravitating latch-holders pivotally connected therewith as required to automatically latch the gate when it is closed.

The numeral 10 designates a gate-post, and 12 a block fixed thereto to widen the post. A frame 13 is slidably connected with the post by means of bearers 14, fixed in the post to extend outward under the frame, and bearers 15, fixed in the block 12 to extend outward over the frame 13 in such a manner as to allow the frame longitudinal motion and also slight vertical vibration. A gate 16 is hinged at its rear lower corner to the post and pivotally connected with the front end of the frame 13 as required to allow the gate to swing to the right and left and also to rise and fall at its front end.

An elbow-shaped latch 17 is pivoted to the front end and top portion of the gate and provided with a forward projection 18 to engage latch-holders 19, pivoted to a post 20 at the front end of the gate in such a manner that when the gate is swung shut the projection 18 will strike the top of one of the latch-holders 19 and depress it as required to pass it, and when it has passed the latch-holder will automatically resume its normal position to retain the gate closed.

Levers 21 and 22 are fulcrumed to the ends of a cross-bar 23, fixed to the top of the post 12 and connected with the rear end of the slidable frame 13 by means of levers 24 and 25, pivoted in the rear end of said frame, and links 26 and 27, connected with ends of the short arms of the levers 21 and 22 and with the ends of the long arms of the levers 24 and 25, and the said long arms are connected with the ends of a cross-piece on the top and rear end portion of the gate 16 by means of links 30, as shown in Figs. 1 and 4, in such a manner that when the long arms of the levers 21 and 22 are depressed they will lift the front end of the gate and move the slidable frame 13 rearward. At the same time that the gate is thus lifted at its front end the latch 17 is disengaged from the holders 19 by means of a triple crank 28 and links 29, connected with the arms at its ends, and the levers 24 and 25, as shown in Fig. 4, and a rod 29, connected with the arm at the center of the triple crank and the latch 17, as shown in Fig. 1.

Having thus set forth the purpose of my invention, its construction, and functions of the different operative parts, the practical operation and utility thereof will be obvious to persons familiar with the art to which it pertains; and

What I claim as new, and desire to secure by Letters Patent, is—

1. In a farm-gate, a post, bearings fixed to the post to support a movable frame, a frame slidably connected with said post for moving a gate, a gate pivotally connected at its top and rear end with the slidable frame and hinged at its bottom and rear end to the post, levers pivoted to the rear end of the slidable frame, levers fulcrumed to the ends of a fixed cross-bar at the top of the post and the short arms connected with the long arms of the levers connected with the slidable frame, in the manner set forth, for the purposes stated.

2. In a farm-gate, a post, bearings fixed to the post to support a movable frame, a frame slidably connected with said post for moving a gate, a gate pivotally connected at its top and rear end with the slidable frame and hinged at its bottom and rear end to the post, levers pivoted to the rear end of the slidable frame, levers fulcrumed to the ends of a fixed cross-bar at the top of the post and their short arms connected with the long arms of the levers connected with the slidable frame, a latch pivoted to the front end of the gate, a triple crank pivotally connected with the rear portion of the gate and with the long arms of the levers pivoted to the slidable frame and a cross-bar on top of the gate and a rod connected with the latch and the triple crank, all arranged and combined in the manner set forth for the purposes stated.

LEWIS P. ROLLINS.

Witnesses:
  B. NEWCOMB,
  F. A. OUTHIER.